XXXX
US007991135B2

(12) United States Patent
Rauba et al.

(10) Patent No.: US 7,991,135 B2
(45) Date of Patent: Aug. 2, 2011

(54) METHODS, SYSTEMS AND COMPUTER PRODUCTS FOR ALWAYS-ON DIALTONE INCENTIVE TO PURCHASE WIRELINE TELEPHONE SERVICES

(75) Inventors: Rimas Rauba, Roswell, GA (US); Gonzalo Salazar, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1029 days.

(21) Appl. No.: 11/834,941

(22) Filed: Aug. 7, 2007

(65) Prior Publication Data

US 2009/0041219 A1    Feb. 12, 2009

(51) Int. Cl.
*H04M 3/42* (2006.01)
(52) U.S. Cl. ............................... 379/201.12; 379/88.22
(58) Field of Classification Search .................. 379/67.1, 379/88.22, 201.01, 201.12
See application file for complete search history.

(56) References Cited

U.S. PATENT DOCUMENTS

| 5,513,250 | A | * | 4/1996 | McAllister | 379/91.02 |
| 5,583,920 | A | * | 12/1996 | Wheeler, Jr. | 379/88.01 |
| 5,594,789 | A | * | 1/1997 | Seazholtz et al. | 379/88.02 |
| 6,272,209 | B1 | | 8/2001 | Bridger et al. | |
| 6,466,573 | B1 | | 10/2002 | Renucci | |
| 6,510,315 | B1 | | 1/2003 | Arnson | |
| 6,512,762 | B1 | | 1/2003 | Renucci et al. | |
| 7,149,182 | B1 | | 12/2006 | Renucci et al. | |
| 2004/0252698 | A1 | | 12/2004 | Anschutz et al. | |

OTHER PUBLICATIONS

"General Bandwidth Assures Delivery of Lifeline Services Via Voice Over DSL Networks" [Online]; [Retrieved on Apr. 4, 2007]; Retrieved from http://www.genband.com/news_pr12000feb3.htm.

* cited by examiner

*Primary Examiner* — Creighton Smith
(74) *Attorney, Agent, or Firm* — Cantor Colburn LLP (57) ABSTRACT

A plain old telephone service (POTS) communications service incentive is offered for maintaining the voice path connection after disconnection of POTS, at a residence or business location. The communications service incentive includes providing an always-on dialtone service from a wireline service provider to a customer premises. After receiving an order to disconnect phone service at the premises, it is determined by a central office computer processor of a wireline service provider whether the premises, which is subject to the order to disconnect phone service, meets a set of requirements for the always-on dialtone service.

20 Claims, 5 Drawing Sheets

"THE TEMPORARY PHONE SERVICE BEING PROVIDED AT THIS PREMISES BY THE NAMED WIRELINE SERVICE PROVIDER IS LIMITED TO A MAXIMUM OF TEN LOCAL CALLS PER MONTH AND EACH CALL IS NOT TO EXCEED TEN MINUTES IN DURATION. IF YOU DESIRE TO PURCHASE PERMENANT UNLIMITED LOCAL AND LONG DISTANCE PHONE SERVICE, PLEASE CONTACT OUR CUSTOMER SERVICE REPRESENTATIVE AT (404) 000 1234 x251 OR PRESS THE POUND (#) SIGN. THIS TEMPORARY PHONE SERVICE IS PROVIDED FOR EMERGENCY USE AND TO ENABLE YOU TO ORDER PERMANENT PHONE SERVICE".

FIRST INFORMATIONAL ADVERTISEMENT

FIG. 2A

"THE TEMPORARY PHONE SERVICE BEING PROVIDED AT THIS PREMISES BY THE NAMED WIRELINE SERVICE PROVIDER IS LIMITED TO A MAXIMUM OF TEN LOCAL CALLS PER MONTH AND EACH CALL IS NOT TO EXCEED TEN MINUTES IN DURATION. THE CURRENT CALL HAS EXCEEDED TEN MINUTES IN DURATION AND WILL BE ENDED AT THIS TIME. IF YOU DESIRE TO PURCHASE PERMENANT UNLIMITED LOCAL AND LONG DISTANCE PHONE SERVICE, PLEASE CONTACT OUR CUSTOMER SERVICE REPRESENTATIVE AT (404) 000 1234 x251 OR PRESS THE POUND (#) SIGN. THIS TEMPORARY PHONE SERVICE IS PROVIDED FOR EMERGENCY USE AND TO ENABLE YOU TO ORDER PERMANENT PHONE SERVICE."

SECOND INFORMATIONAL ADVERTISEMENT 731

*FIG. 2B*

"THE TEMPORARY PHONE SERVICE BEING PROVIDED AT THIS PREMISES BY THE NAMED WIRELINE SERVICE PROVIDER IS LIMITED TO A MAXIMUM OF TEN LOCAL CALLS PER MONTH AND EACH CALL IS NOT TO EXCEED TEN MINUTES IN DURATION. THE CURRENT CALL HAS EXCEEDED THE MAXIMUM NUMBER OF CALLS PERMITTED AND WILL BE ENDED AT THIS TIME. IF YOU DESIRE TO PURCHASE PERMANENT UNLIMITED LOCAL AND LONG DISTANCE PHONE SERVICE, PLEASE CONTACT OUR CUSTOMER SERVICE REPRESENTATIVE AT (404) 000 1234 x251 OR PRESS THE POUND (#) SIGN. THIS TEMPORARY PHONE SERVICE IS PROVIDED FOR EMERGENCY USE AND TO ENABLE YOU TO ORDER PERMANENT PHONE SERVICE."

THIRD INFORMATIONAL ADVERTISEMENT 732

*FIG. 2C*

"THE TEMPORARY PHONE SERVICE BEING PROVIDED AT THIS PREMISES BY THE NAMED WIRELINE SERVICE PROVIDER IS LIMITED TO A MAXIMUM OF TEN LOCAL CALLS PER MONTH AND EACH CALL IS NOT TO EXCEED TEN MINUTES IN DURATION. IT HAS BEEN DETERMINED THAT FIVE LONG DISTANCE CALLS HAVE BEEN ATTEMPTED AT THIS PREMISES; THEREFORE, THIS CALL WILL BE ENDED AT THIS TIME. IF YOU DESIRE TO PURCHASE PERMANENT UNLIMITED LOCAL AND LONG DISTANCE PHONE SERVICE, PLEASE CONTACT OUR CUSTOMER SERVICE REPRESENTATIVE AT (404) 000 1234 x251 OR PRESS THE POUND (#) SIGN. THIS TEMPORARY PHONE SERVICE IS PROVIDED FOR EMERGENCY USE AND TO ENABLE YOU TO ORDER PERMANENT PHONE SERVICE."

FOURTH INFORMATIONAL ADVERTISEMENT 733

METHODS, SYSTEMS AND COMPUTER PRODUCTS FOR ALWAYS-ON DIALTONE INCENTIVE TO PURCHASE WIRELINE TELEPHONE SERVICES

TECHNICAL FIELD

The present invention relates generally to plain old telephone service (POTS) communications, and more particularly relates to maintaining the voice path connection after disconnection of POTS, at a residence or business location, has been effected.

BACKGROUND

The loss of local access lines is an issue facing wireline service providers. Without the maintenance of the local line connection, the wireline service provider is constrained and/or precluded from offering and/or selling all of their other services and products.

Many times when customers move to a new residence or location, they need to use a separate device (e.g., wireless, neighbor's telephone, etc.) to initiate telephone service. Usually, cable companies and utility companies are contacted before the telephone company, thereby, putting the reacquisition of the customer at risk for wireline service providers. In addition, even when POTS telephone service has been disconnected to a residence or business, an occasion may arise where emergency POTS is critical for public safety reasons.

Therefore, the need exists for POTS to be maintained at a residence and/or business location, in order to serve as an incentive for wireline service customers to renew wireline service from a wireline service provider offering the incentive.

In addition, the need exists for POTS to be available in residences and business locations, after a request for disconnection of POTS, at a residence or business location, has been requested, to provide communications services to the premises in case of public safety emergencies.

BRIEF SUMMARY

Exemplary embodiments include a method, a system and an article of manufacture for providing automatically to a potential customer from a wireline service provider a communications service incentive. The purpose of the communications service incentive is to influence potential customers to purchase a communications service. The communications service incentive may include but is not limited to local and/or long distance wireline and/or wireless service. After receiving an order to disconnect all telephone service at a premises, it is determined by a central office computer processor of the wireline and/or wireless service provider whether the premises, which is subject to the order to disconnect telephone service, meets a set of requirements for an always-on dialtone service.

If the premises subject to the disconnect telephone service order does meet the set of requirements for an always-on dialtone marketing campaign incentive, then a call made by a caller at the premises is completed and directed to a recording of an informational advertisement message, where the caller is prompted to place an order for a communications service from the wireline and/or wireless service provider (herein referred to interchangeably as a communications service provider, a wireline service provider, a wireless service provider, and a service provider). If the caller purchases at least one wireline communications service from the communications service provider, then the incentive is removed by ending the always-on dialtone promotional service after the newly purchased communications service is effective.

If the premises subject to the disconnect telephone service order does not meet the set of requirements for the always-on marketing campaign, then the promotional always-on dialtone telephone service to the premises is ended.

Other systems, methods, and/or computer executable program products according to exemplary embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES:

FIGS. 2A, 2B, 2C, and 2D illustrate examples of a first, second, third and fourth informational advertisement presented to a potential customer in the operations of the method illustrated in FIGS. 1A, 1B and 1C;

The detailed description explains the exemplary embodiments, together with advantages and features, by way of example with reference to the drawings.

DETAILED DESCRIPTION OF EXEMPLARY EMBODIMENTS

Exemplary embodiments of a computer system software development service offering a method, system and article of manufacture are described in detail below. The disclosed exemplary embodiment is intended to be illustrative only, since numerous modifications and variations therein will be apparent to those of ordinary skill in the art. In reference to the drawings, like numbers will indicate like parts continuously throughout the view. Further, the terms "a", "an", "first", "second", "third" and "fourth" herein do not denote limitations of quantity, but rather denote the presence of one or more of the referenced item(s).

Figure 1A:
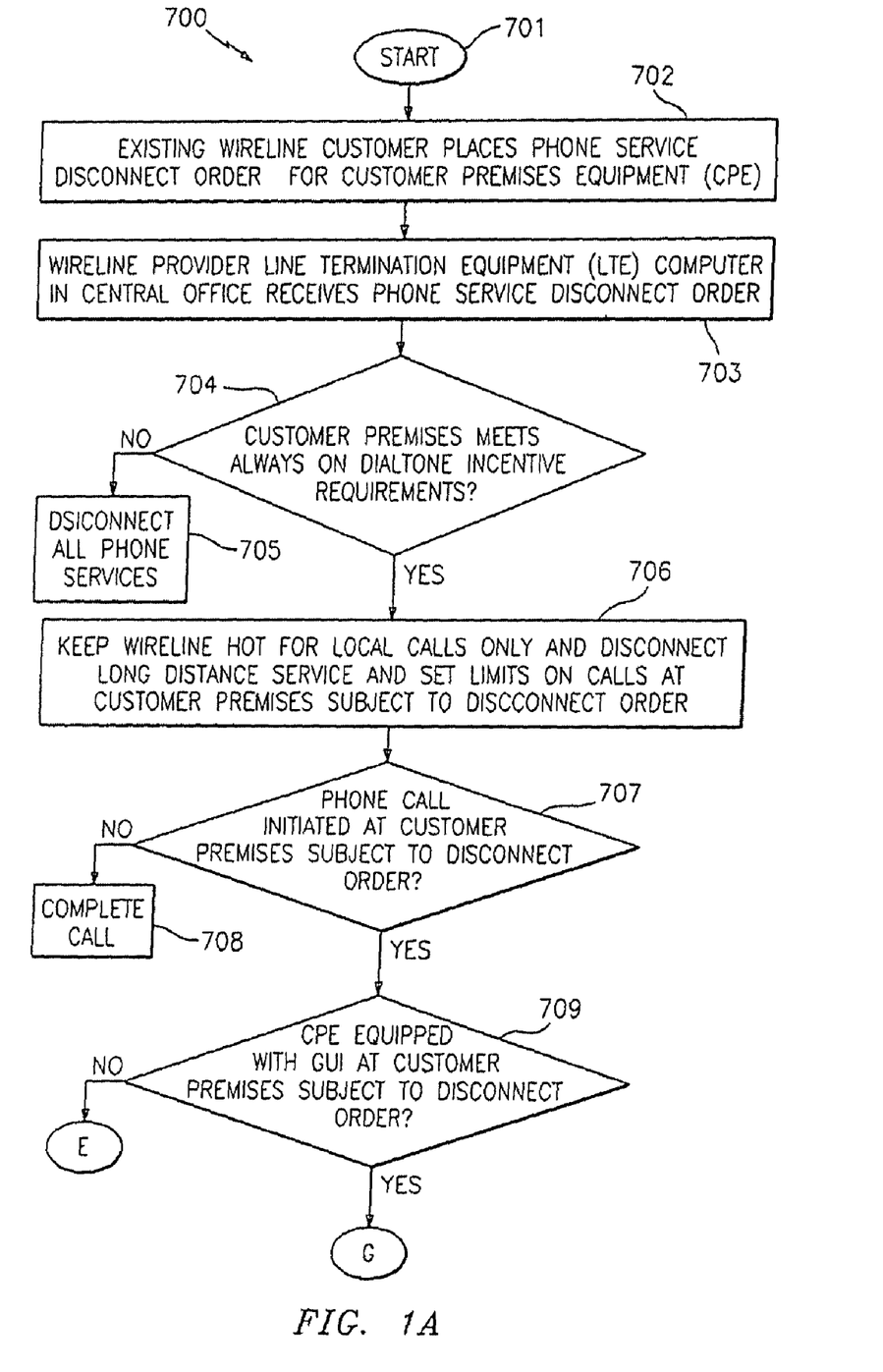
FIGS. 1A, 1B and 1C illustrate operations in a method for an always-on dialtone incentive marketing campaign to motivate potential customers to purchase wireline telephone services from a wireline service provider company.
Figure 1B:
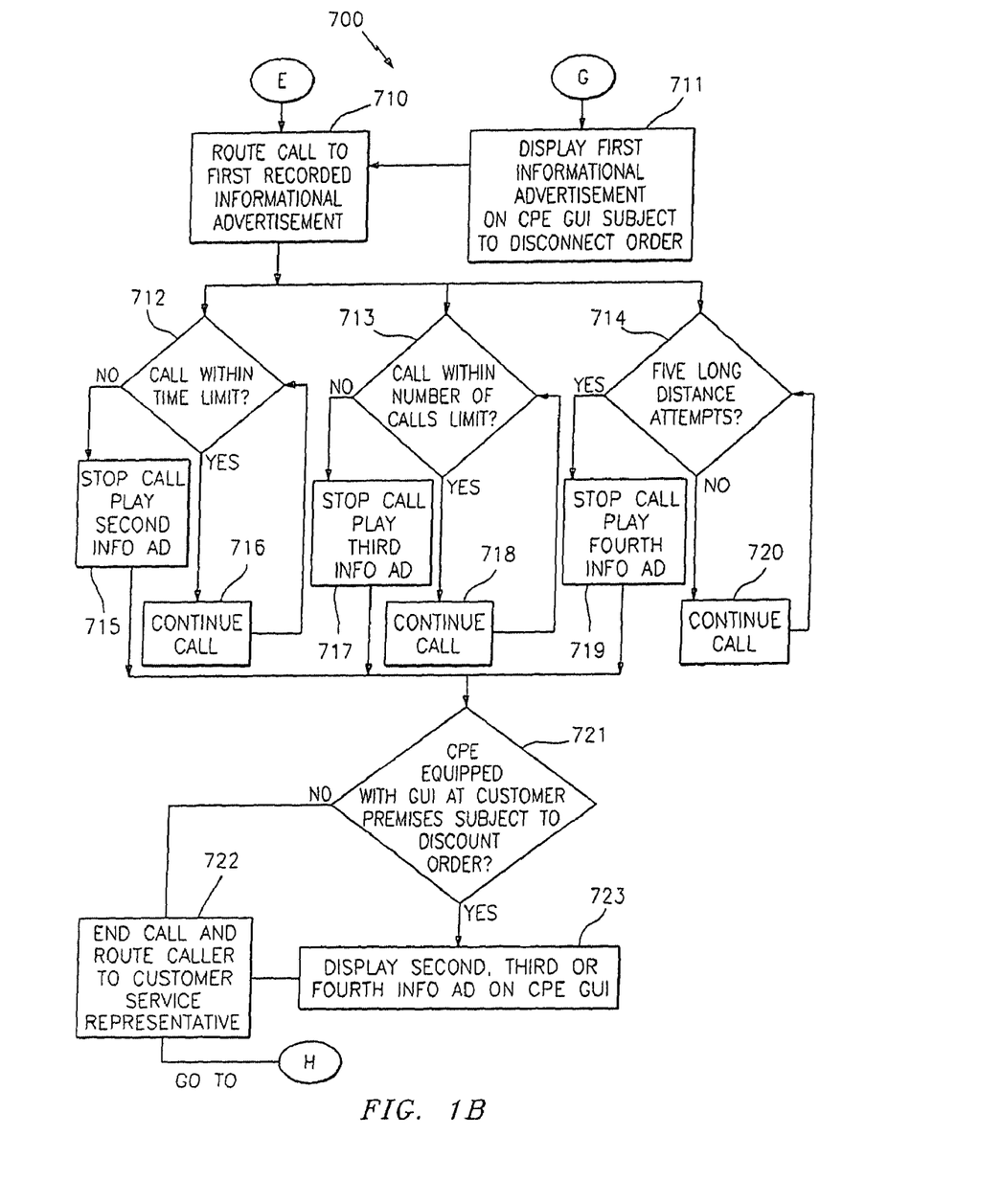
Figure 1C:
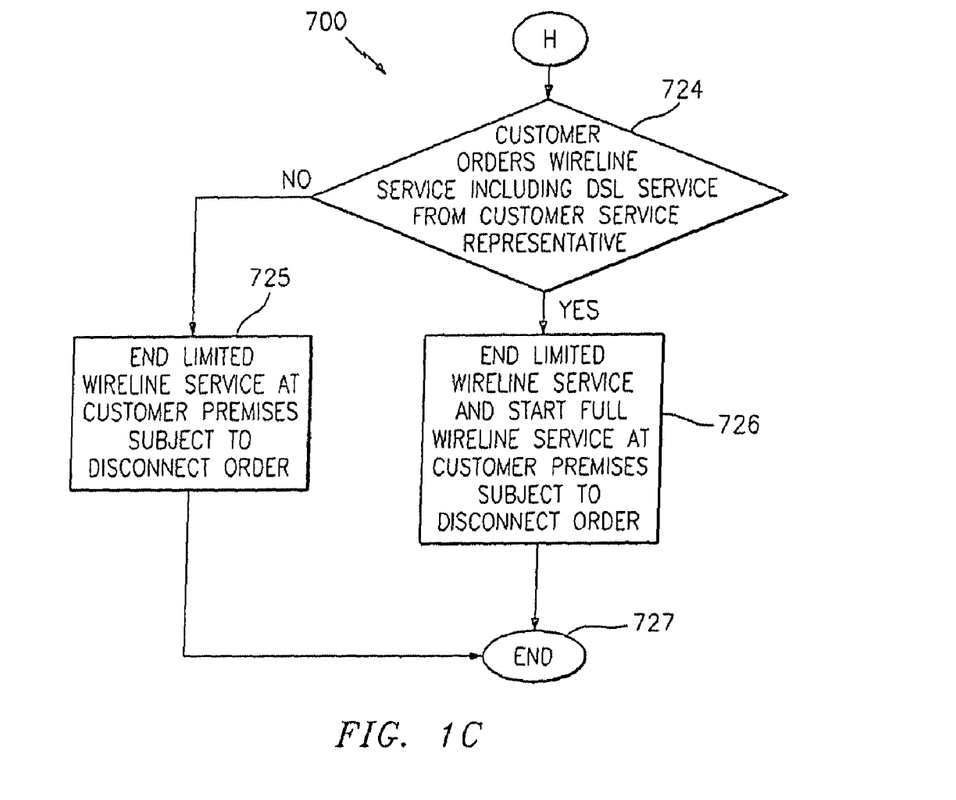
Figure 2A:
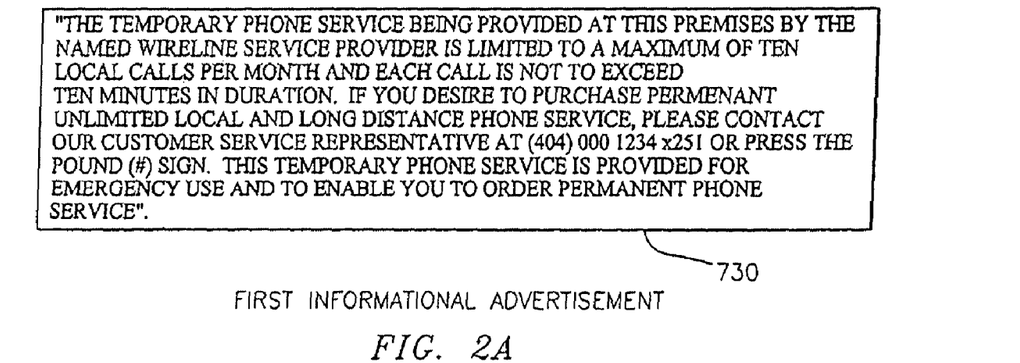
Figure 3:
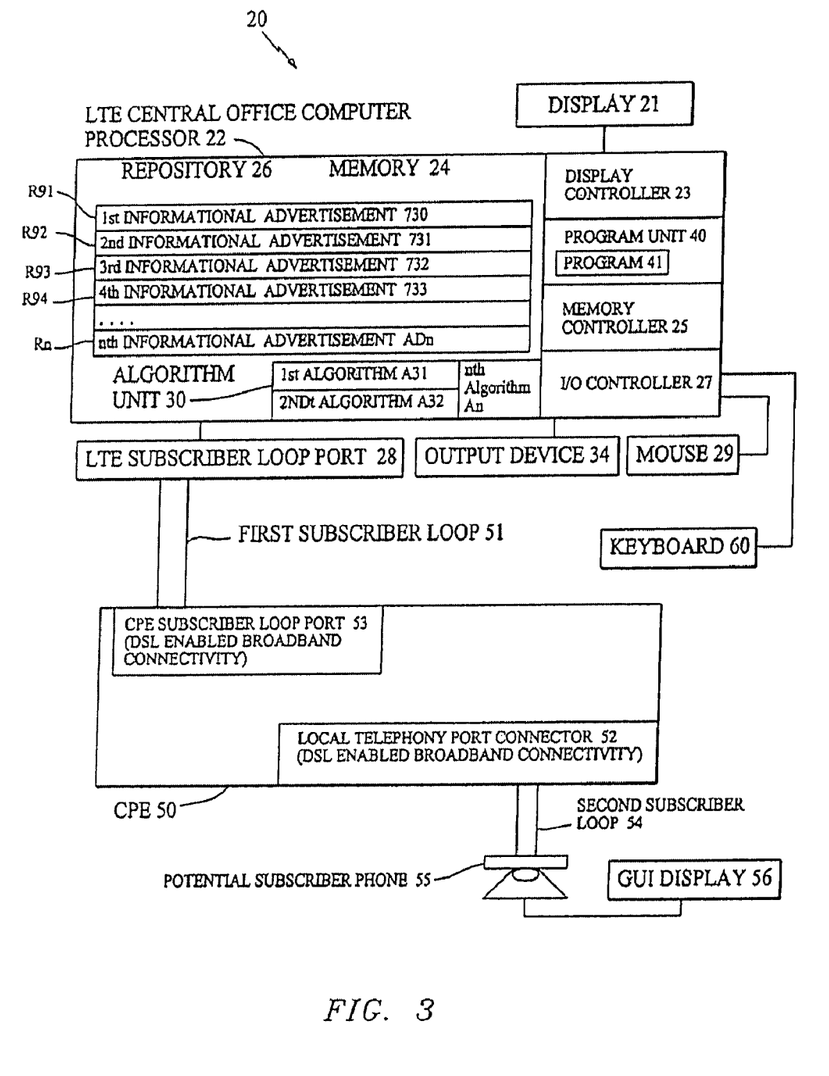
FIG. 3 illustrates the system implementing the operations of the method illustrated in FIGS. 1A, 1B and 1C.

Exemplary embodiments are disclosed herein illustrating an automated communications service incentive that includes an always-on dialtone service for plain old telephone service (POTS) offered as an incentive by a wireline service provider company to motivate prospective wireline service customers to purchase at least one local and/or long distance wireline and/or wireless service from the wireline service provider company. An always-on dialtone incentive method 700 (herein referred to as method 700) is illustrated in FIGS. 1A, 1B and 1C. A first (1st) informational advertisement 730, second (2nd) informational advertisement 731, third (3rd) informational advertisement 732 and fourth (4th) informational advertisement are illustrated in FIGS. 2A, 2B, 2C and 2D respectively. In addition, the informational advertisements 730-733 are herein generically referred to as info ads. Even though, FIGS. 2A through 2D illustrate the first, second, third and fourth informational advertisements 730-733, there may be a plurality of informational advertisements with different or other information and from an other of the plurality of informational advertisements, informing the caller about at least one of the use restrictions associated with the communications service incentive. Thus, FIGS. 2A through 2D illustrate only a small sample of examples of possible informational advertisements that may be presented to subscribers in the exemplary embodiments. The method 700 is implemented in a program 41 by an always-on dialtone incentive computer system 20 (herein referred to as the computer system 20). Thus, the computer system 20, which includes the program 41, is illustrated in FIG. 3. Exemplary embodiments described herein automatically incentivize prospective wireline service customers to purchase local and/or long distance wireline services from the wireline service provider company.

Referring to FIG. 3, the computer system 20 includes a line termination equipment (LTE) central office computer processor 22 (herein referred to as computer processor 22), which contains a memory 24. According to exemplary embodiments, the computer processor 22 is programmed to automatically manage the wireline service provider's line termination equipment in the wireline service provider's central office. An algorithm unit 30 resides in the memory 24 of the computer processor 22 and contains a plurality of algorithms including first algorithm A31 and second algorithm A32 up to nth algorithm An.

Also, residing in the computer processor 22 is a program unit 40 containing the program 41. The memory 24 also contains a repository 26, which is composed of a plurality of repository entry locations R91, R92, R93, R94 up to Rn, which hold the 1st informational advertisement 730, second informational advertisement 731, third informational advertisement 732 and fourth informational advertisement 733 respectively, up to an nth informational advertisement Adn.

In addition, the (computer processor 22 contains a combination of controllers including a display controller 23, a memory controller 25 and an input/output (I/O) controller 27. The computer processor 22 also has a combination of computer peripheral devices connected to the computer processor 22 including a display 21, a set of input devices including a keyboard 60, an output device 34 and a mouse 29.

Also, the computer processor 22 is operatively coupled to a customer premises equipment module (CPE 50) via a LTE subscriber loop port 28 and a first subscriber loop 51. In addition, the CPE 50 may contain a CPE subscriber loop port 53, which may be enabled for DSL broadband connectivity, which is cooperatively coupled to the first subscriber loop 51. Also, the CPE 50 contains a local telephony port connector 52, providing customer premises equipment connection capability which may be DSL enabled for DSL broadband connectivity and which is operatively coupled to a potential subscriber telephone 55 (also, referred to herein as phone 55) via a second subscriber loop 54. The potential subscriber phone 55 may be a rotary or digital dial telephone etc., and may contain a graphical user interface (GUI) with a graphical display, depicted as a GUI display 56 in FIG. 3. The potential subscriber supplies and connects the potential subscriber phone 55 to the local telephony port connector 52. Other possible types of CPE equipment may be connected to the network, to include digital subscriber line (DSL) broadband connected equipment.

The method 700 may be stored as computer readable program code on a computer executable medium composing the program 41, which is an article of manufacture residing in the program unit 40. According to exemplary embodiments, the computer readable program code of the program 41, when executed by the computer processor 22, causes the computer processor 22 to perform the operations of the method 700.

Referring to FIG. 1A and FIG. 3, at operation start 701, operations of the method 700 are initiated when an existing wireline customer, moving from one premises to another premises (e.g., moving across town or even across the country from one home to a new home) places a telephone service disconnect order for customer premises equipment (CPE 50) at operation 702, via voice, i.e., a telephone, or hardcopy mail converted electronically for transmission by other electronic means, such as via a facsimile transmission or over the Internet, requesting the local wireline service provider company to disconnect the wireline phone service to the CPE 50 at the premises the customer is leaving. The telephone service disconnect order may be sent electronically via e-mail or facsimile to the wireline service provider company's central office from the wireline service provider's customer service office. At the central office, the telephone service disconnect order may be manually (i.e., via paper or keyed in) and/or electronically entered into and received by the computer processor 22, at operation 703 by either an e-mail communications protocol or input through input devices including the keyboard 60 and/or the mouse 29, wherein the information about the request is captured by the program 41 via one of the algorithms callable from the algorithm unit 30 by the program 41.

The program 41, running on the computer processor 22, is coded to determine at step 704 whether or not the customer premises, which is subject to the telephone service disconnect order, meets a set of physical requirements for an always-on dialtone marketing campaign incentive offered by the wireline service provider company to influence and motivate prospective customers to purchase wireline POTS services from the wireline service provider company. In order to verify that the customer premises meets the set of requirements, after the telephone disconnect order is received by the computer processor 22, through an algorithm, program 41 initiates a service request to a field service representative of the wireline service provider company and a human field service representative inspects the customer premises and responds electronically to the service request with an indication of whether or not the customer premises meets the set of physical requirements for the always-on dialtone service. Examples of premises' requirements include whether or not the building has been demolished or damaged by fire or other natural causes, or whether the building is still standing and habitable. If the premises subject to the telephone service disconnect order does not meet the requirements for the always-on dialtone marketing campaign (NO), then according to exemplary embodiments, all telephone service to the premises is disconnected at operation 705, by the computer processor 22. If the premises subject to the telephone service disconnect order meets the requirements of the marketing campaign (YES), then, at operation 706, the computer processor 22 keeps the wireline POTS service at the CPE 50 premises hot (i.e., enabled) for local calls only and disconnects the long distance service, according to exemplary embodiments. Therefore, any prospective subscriber moving into the premises or any person who happens to have access to the premises subject to the telephone service disconnect order has access to live, active telephone service; and, if a potential subscriber phone, such as the potential subscriber phone 55, is connected to the local telephony port 52 at the premises subject to the telephone service disconnect order, then local calls can be made from the potential subscriber phone 55, according to certain use restrictions. In this embodiment, potential subscribers provide their own telephone equipment, such as the potential subscriber phone 55, illustrated in FIG. 3.

The computer processor 22 is programmed to administer a set of use restrictions on the hot local calling capability at the premises subject to the telephone service disconnect order. The use restrictions can include: a time limit on the duration of calls that are made; a limit on the number of calls that can be made over a certain period of time and restrictions on placing and/or attempting to place unauthorized long distance calls and any other abuse and violation of the always-on dialtone promotional marketing campaign service. These use restrictions may be communicated to a potential subscriber through prerecorded informational advertisement messages, such as the first, second, third, and fourth advertisements 730-733.

Referring to FIGS. 1A, 1B and 3, in operation 707, if the computer processor 22 determines that an active telephone call on the wireline at the premises subject to the disconnect order was not placed at the premises (NO), then the call is allowed to be completed at operation 708. If the computer processor 22 determines that an active telephone call on the wireline at the premises subject to the disconnect order was initiated at the premises (YES), then the computer processor 22 determines in operation 709, from collected monitored information, whether the potential subscriber phone 55 connected to the local telephony port 52 of the CPE 50 at the premises is equipped with a graphical user interface (GUI) and graphical display (herein referred to as the "GUI display 56"). LTE central office automated signal and device monitoring equipment and methods known in the art are employed to monitor signal origination of the active call being conducted on the potential subscriber phone 55 and monitor the type of equipment including the absence or presence of a GUI display the potential subscriber phone may be equipped with. Such monitored information is collected by the program 41 via one of the algorithms callable from the algorithm unit 30 by the program 41. If the potential subscriber phone 55 does not have a GUI display (NO), such as the GUI display 56, then at operation 710, the computer processor 22 automatically routes the active telephone call to the recorded first informational advertisement 730. If the potential subscriber phone 55 does have a GUI display (YES), such as the GUI display 56, then at operation 711, the computer processor 22 displays the first informational advertisement 730 on the GUI display 56 of the potential subscriber phone 55 and automatically routes the active call to a recording of the first informational advertisement 730 at operation 710, where the user of the potential subscriber phone 55 hears and/or sees the first informational advertisement 730. According to exemplary embodiments, the first informational advertisement 730 communicates the following information in the form of a first message to the user of the potential subscriber phone 55 and/or to the GUI display 56, as illustrated in FIG. 2A: "THE TEMPORARY PHONE SERVICE BEING PROVIDED AT THIS PREMISES BY THE NAMED WIRELINE SERVICE PROVIDER IS LIMITED TO A MAXIMUM OF TEN LOCAL CALLS PER MONTH AND EACH CALL IS NOT TO EXCEED TEN MINUTES IN DURATION. IF YOU DESIRE TO PURCHASE PERMANENT UNLIMITED LOCAL AND LONG DISTANCE PHONE SERVICE, PLEASE CONTACT OUR CUSTOMER SERVICE REPRESENTATIVE AT (404) 000 1234 x251 OR PRESS THE POUND (#) SIGN. THIS TEMPORARY PHONE SERVICE IS PROVIDED FOR EMERGENCY USE AND TO ENABLE YOU TO ORDER PERMANENT PHONE SERVICE".

After the first informational advertisement 730 has been heard and/or displayed, the active call is allowed to continue. During the active call, additional determinations are made by the computer processor 22. The additional determinations may include determining whether or not the active call meets the time duration limit restriction governing the active call; whether or not the active call is within the number of calls that can be made on the wireline within a certain time period; whether any number of attempts at making a long distance telephone call from the wireline have taken place; and whether any other abuses of the telephone service have occurred. LTE central office computer automated signal monitoring equipment and methods known in the art are employed to monitor and indicate the status of signals representing information in regard to each of the above restrictions. Such monitored information is collected by program 41 via one of the algorithms callable from the algorithm unit 30 by program 41. Once, collected, such signal information is used by program 41 in making the additional determinations.

In the exemplary embodiments, at operation 712, if the computer processor 22 determines that the active telephone call is within the call time limit (YES), then the call is allowed to continue at operation 716. In addition, the computer processor 22 loops back to operation 712 and continues to determine whether the active call is within the predefined call time limit. Also, at operation 712, if the computer processor 22 determines that the telephone call has exceeded the active call time limit, then at operation 715, the call is interrupted by the playing of the second informational advertisement 731, which is prerecorded, and if the computer processor 22 determines in operation 721 that the potential subscriber phone 55 is equipped with a GUI display, such as the GUI display 56 (YES), then the second informational advertisement 731 is also displayed on the GUI display 56 at operation 723. According to exemplary embodiments, the second informational advertisement 731 communicates the following information in the form of a second message to the user of the potential subscriber phone 55 and/or to the GUI display 56, as illustrated in FIG. 2B: "THE TEMPORARY PHONE SERVICE BEING PROVIDED AT THIS PREMISES BY THE NAMED WIRELINE SERVICE PROVIDER IS LIMITED TO A MAXIMUM OF TEN LOCAL CALLS PER MONTH AND EACH CALL IS NOT TO EXCEED TEN MINUTES IN DURATION. THE CURRENT CALL HAS EXCEEDED TEN MINUTES IN DURATION AND WILL BE ENDED AT THIS TIME. IF YOU DESIRE TO PURCHASE PERMANENT UNLIMITED LOCAL AND LONG DISTANCE PHONE SERVICE, PLEASE CONTACT OUR CUSTOMER SERVICE REPRESENTATIVE AT (404) 000 1234 x251 OR PRESS THE POUND (#) SIGN. THIS TEMPORARY PHONE SERVICE IS PROVIDED FOR EMERGENCY USE AND TO ENABLE YOU TO ORDER PERMANENT PHONE SERVICE".

In the exemplary embodiments, at operation 713, if the computer processor 22 determines that the active telephone call is within the number of calls limit (YES), then the call is allowed to continue at operation 718. The computer processor 22 then loops back to operation 713 and continues to determine whether the active call is within the predefined number of calls limit. Also, at operation 713, if the computer processor 22 determines that the telephone call has exceeded the number of calls limit, then at operation 717, the call is interrupted by the playing of the third informational advertisement 732, which is prerecorded in a manner similar to the rest of the group of info ads 730-733, and if the computer processor 22 determines in operation 721 that the potential subscriber phone 55 is equipped with a GUI display (YES), such as the GUI display 56, then the third informational advertisement 732 is also displayed on the GUI display 56 at operation 723. According to exemplary embodiments, the third informational advertisement 732 communicates the following message to the user of the potential subscriber phone 55 and/or to the GUI display 56, as illustrated in FIG. 2C: "THE TEMPORARY PHONE SERVICE BEING PROVIDED AT THIS PREMISES BY THE NAMED WIRELINE SERVICE PROVIDER IS LIMITED TO A MAXIMUM OF TEN LOCAL CALLS PER MONTH AND EACH CALL IS NOT TO EXCEED TEN MINUTES IN DURATION. THE CURRENT CALL HAS EXCEEDED THE MAXIMUM NUMBER OF CALLS PERMITTED AND WILL BE ENDED AT THIS TIME. IF YOU DESIRE TO PURCHASE PERMANENT UNLIMITED LOCAL AND LONG DISTANCE PHONE SERVICE, PLEASE CONTACT OUR CUSTOMER SERVICE REPRESENTATIVE AT (404) 000 1234 x251 OR PRESS THE POUND (#) SIGN. THIS TEMPORARY PHONE SERVICE IS PROVIDED FOR EMERGENCY USE AND TO ENABLE YOU TO ORDER PERMANENT PHONE SERVICE".

Further, in the exemplary embodiments, at operation 714, if the computer processor 22 determines that the active telephone call initiated at the customer premises subject to a disconnect order involves less than a predetermined number of attempts to place a long distance call, such as five (5) attempts (i.e., "FIVE LONG DISTANCE ATTEMPTS NO), then the call is allowed to continue at operation 720, and the computer processor 22 loops back to operation 714 and continues to determine whether the active telephone call is within the predefined number of attempts to make a long distance call. Also, at operation 714, if the computer processor 22 determines that the active telephone call has equaled or exceeded the predefined number of attempts to place a long distance call (YES), then at operation 719, the call is interrupted by the playing of the prerecorded third informational advertisement 732 and if the computer processor 22 determines in operation 721, that the potential subscriber phone 55 is equipped with a GUI display (YES), such as the GUI display 56, then the third informational advertisement 732 is also displayed on the GUI display 56 at operation 723. According to exemplary embodiments, the third informational advertisement 732 communicates the following message to the user of potential subscriber phone 55 and/or to the GUI display 56, as illustrated in FIG. 2D: "THE TEMPORARY PHONE SERVICE BEING PROVIDED AT THIS PREMISES BY THE NAMED WIRELINE SERVICE PROVIDER IS LIMITED TO A MAXIMUM OF TEN LOCAL CALLS PER MONTH AND EACH CALL IS NOT TO EXCEED TEN MINUTES IN DURATION. IT HAS BEEN DETERMINED THAT FIVE LONG DISTANCE CALLS HAVE BEEN ATTEMPTED AT THIS PREMISES; THEREFORE, THIS CALL WILL BE ENDED AT THIS TIME. IF YOU DESIRE TO PURCHASE PERMANENT UNLIMITED LOCAL AND LONG DISTANCE PHONE SERVICE, PLEASE CONTACT OUR CUSTOMER SERVICE REPRESENTATIVE AT (404) 000 1234 x251 OR PRESS THE POUND (#) SIGN. THIS TEMPORARY PHONE SERVICE IS PROVIDED FOR EMERGENCY USE AND TO ENABLE YOU TO ORDER PERMANENT PHONE SERVICE".

In exemplary embodiments, other similar informational advertisements can be displayed, in regard to other types of long distance abuses and/or attempted abuses detected by the computer processor 22, in regard to the CPE 50 equipment at the premises subject to the disconnect order. The limits recited in the above informational advertisements 730-733 are presented as examples only and different limits can be used at the discretion of a human operator who can modify the limits through programming an unlimited amount of different limits into the program 41.

The method 700 proceeds to operation 722, if at either operation 715, 717 or 719, the active telephone call is stopped by the computer processor 22, after the respective informational advertisements have been played by the recording at operations 715, 717 and 719 and/or displayed at operation 723, based on the results of the determination in operation 721, then as illustrated in FIG. 1B at operation 722, the call is routed to a customer service representative. In addition, if the computer processor 22 determines in operation 721, that the potential subscriber phone 55 is not equipped with a GUI display (NO), such as the GUI display 56, then at operation 722 the call is routed to a customer service representative. The customer service representative can be either a live representative or an automated representative activated by the program 41. According to exemplary embodiments, the customer service representative, through various prompts, again offers the caller the opportunity to order wireline service from the wireline service provider company.

Referring to FIG. 1C, if it is determined by the computer processor 22 at operation 724 that the caller does not order wireline service (including DSL broadband service) from the customer service representative (NO), then at operation 725, temporary limited always-on dialtone promotional service is terminated at the customer premises subject to the disconnect order by the computer processor 22, and method 700 proceeds to operation END 727 (i.e., disconnecting and stopping all phone service). In the exemplary embodiments, at operation 724 if it is determined by the computer processor 22, that the caller does order wireline service or DSL service from the customer service representative (YES), then the temporary limited always-on dialtone promotional service is continued until the customer's order goes into effect. After the new service is effective, then at operation 726, the temporary, limited always-on dialtone promotional service is terminated at the customer premises subject to the disconnect order by the computer processor 22, and the method 700 proceeds to operation END 727. The method 700 can be repeated for any number of other premises.

In the exemplary embodiments, the method 700 is implemented in software, as a computer executable program, which is the program 41 and is executed by the computer processor 22, which is a hardware device for executing software, particularly that is stored in the memory 24. The computer processor 22 can be any custom made or commercially available processor, a central processing unit (CPU), an auxiliary processor, a semiconductor based microprocessor (in the form of a microchip or ship set, a macro-processor, or generally any device for executing software instructions, such as a special or general purpose digital computer, personal computer (PC), workstation, minicomputer or mainframe computer. The memory 24 can include any one or combination of volatile memory elements, such as random access memory (RAM, DRAM, SRAM or SDRAM), as well as, any nonvolatile memory elements such as erasable programmable read only memory (EPROM EEPROM or Flash memory), programmable read only memory (PROM), tape, compact disc read only memory (CDROM), disk, diskette, cartridge, cassette, optical fiber. The computer-readable medium may be paper or another suitable medium upon which the program is printed, and then electronically captured via optical scanning, then compiled, interpreted or otherwise processed in a suitable manner for storage in a computer memory. The software in the memory 24 can include one or more separate programs, algorithms, micro-programs, macro-programs or utilities, each of which comprises an ordered listing of executable instructions for implementing logical functions.

As described above, the exemplary embodiments can be in the form of computer-implemented processes and systems for practicing those processes. The exemplary embodiments can also be in the form of computer program code containing instructions embodied in tangible media, such as floppy diskettes, CDROMs, hard drives, or any other computer-readable storage medium, whether stored in a storage medium, loaded into and/or executed by a computer, or transmitted over some transmission medium, such as over electrical wiring or cabling, through fiber optics, or via electromagnetic radiation, when the computer program code is loaded into and executed by a computer, the computer becomes an apparatus for practicing the exemplary embodiments. Also, when implemented on a general-purpose microprocessor, the computer program code segments can configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A method for providing an incentive to purchase a communications service, the method comprising:
   receiving an order to disconnect telephone service at a premises;
   determining whether the premises meets a set of requirements for an always-on dialtone service;
   completing a call made by a caller at the premises;
   providing a first message prompting the caller to place an order for the communications service; and
   if the order for the communications service is received, then providing the always-on dialtone service until the ordered communications service is provided.

2. The method according to claim 1, wherein the incentive is offered for plain old telephone service (POTS) at the premises, wherein the premises has a customer premises equipment connection for a customer premises equipment, and wherein the set of requirements for the incentive offered as the always-on dialtone service includes determining whether the premises is habitable and whether the call was initiated at the premises.

3. The method according to claim 2, further comprising:
   administering a set of use restrictions on local calls, if the premises is habitable, wherein the set of use restrictions includes at least one of a time limit on the call, a limit on a number of calls that can be made and a limit on a number of attempts at making unauthorized long distance calls from the premises; and
   performing one of disconnecting, all telephone service to the premises, if a computer processor determines that the premises does not meet the set of requirements and keeping only local telephone service at the premises, if the premises meets the set of requirements.

4. The method according to claim 3, wherein the set of use restrictions are communicated to the caller by the first message, and wherein the first message is presented to the caller via at least one of a recorded message and a GUI display associated with the customer premises equipment.

5. The method according to claim 1, further comprising terminating the always-on dialtone service, if the order for the communications service is not received.

6. The method according to claim 1, wherein the first message includes information informing the caller that the always-on dialtone service is being provided to the caller to enable the caller to place the order for the communications service by directing the caller to contact a customer service representative and to use the always-on dialtone service for emergencies.

7. The method according to claim 3, further comprising:
   determining whether an at least one use restriction of the set of use restrictions is violated; and
   if the at least one use restriction of the set of use restrictions is violated, then providing a second message indicating the at least one use restriction is violated, and stopping the call.

8. The method according to claim 7, further comprising routing the call to the customer service representative after the call is stopped.

9. A system for providing to a potential customer from a wireline service provider an incentive to purchase a communications service, the system comprising:
   a computer system containing a computer processor; and
   a program unit residing in the computer processor, wherein the program unit contains a computer executable program that when executed by the computer processor causes the computer system to:
   receive in a central office of a wireline service provider an order to disconnect telephone service at a premises;
   determine whether the premises meets a set of requirements for an always-on dialtone service, wherein the premises is subject to the order to disconnect telephone service at the premises;
   complete a call made by a caller at the premises, route the call to a recording of an informational advertisement and prompt the caller to place an order for the communications service, wherein the communications service includes local and long distance wireline service from the wireline service provider; and
   perform one of removing the incentive, if the caller does not order any service from the wireline service provider and removing the incentive after the caller purchases at least one wireline service from the wireline service provider.

10. The system according to claim 9, wherein the incentive to purchase the communications service is offered for plain old telephone service (POTS) at the premises, wherein the premises has a customer premises equipment connection for a customer premises equipment, wherein the set of requirements for the incentive offered as the always-on dialtone service, includes determinations of whether the premises is habitable and whether the call was initiated at the premises, wherein the call is made on a phone supplied by the caller, and wherein the phone supplied by the caller is connected to the customer premises equipment connection.

11. The system according to claim 10, wherein the computer executable program when executed by the computer processor further causes the computer system to administer a set of use restrictions on local calls, if the premises is habitable, wherein the set of use restrictions includes one of a time limit on the call, a limit on a number of calls that can be made and a limit on a number of attempts at making long distance calls from the premises, wherein the computer processor performs one of disconnecting all telephone service to the premises, if the computer processor determines that the premises does not meet the set of requirements and keeping only local telephone service at the premises, if the premises meets the set of requirements, and wherein the customer premises equipment connection includes DSL broadband connectivity.

12. The system according to claim 11, further including a GUI display associated with the phone supplied by the caller, wherein the set of use restrictions are communicated to the caller by the informational advertisement, and wherein the informational advertisement is presented to the caller via at least one of a recorded message and the GUI display associated with the phone supplied by the caller.

13. The system according to claim 10, wherein removing the incentive terminates the always-on dialtone service.

14. The system according to claim 10, wherein the informational advertisement includes a first message informing the caller that the always-on dialtone service is being provided to the caller to enable the caller to place the order for the communications service by directing the caller to contact a customer service representative and to use the communications service for emergencies.

15. The system according to claim 11, wherein the computer executable program when executed further causes the computer system to determine whether an at least one use restriction of the set of use restrictions is violated; and wherein if the at least one use restriction is violated, then to provide a second message informing the caller that the at least one use restriction is violated, and to stop the call.

16. The system according to claim 15, wherein the computer executable program when executed further causes the computer system to route the call to the customer service representative after the call is stopped.

17. An article of manufacture comprising a non-transitory computer executable medium including a computer readable program code stored on the computer executable medium and when the computer readable program code is executed by a computer processor the computer readable program code causes the computer processor to perform a method of automatically providing a communications service incentive, the method comprising:
   receiving an order to disconnect telephone service at a premises;
   determining whether the premises meets a set of requirements for initiating an always-on dialtone service;
   completing a call made by a caller at the premises, routing the call to a recording of an informational advertisement and prompting the caller to place an order for a wireline service from a wireline service provider; and
   performing one of ending the always-on dialtone service, if the caller does not order any service from the wireline service provider and ending the always-on dialtone service after the caller purchases at least one wireline service from the wireline service provider.

18. The article of manufacture according to claim 17, wherein the computer readable program code causes the computer processor to further automatically administer a set of use restrictions on the always-ort dialtone service, if the premises is habitable, wherein the set of use restrictions includes one of a time limit on the call, a limit on a number of calls that can be made and a limit on a number of attempts at making long distance calls from the premises.

19. The article of manufacture according to claim 18, wherein, the computer readable program code causes the computer processor to further automatically determine whether a use restriction of the set of use restrictions is violated; and if the use restriction is violated, then provide a second message indicating that the use restriction is violated, and stop the call.

20. The article of manufacture according to claim 19, wherein, the computer readable program code causes the computer processor to further automatically route the call to a customer service representative after the call is stopped, and wherein the customer service representative prompts the caller to purchase local and long distance service.

* * * * *